ОR 3,973,826

United States
Lobb

[11] 3,973,826
[45] Aug. 10, 1976

[54] SCANNING DEVICES
[75] Inventor: Daniel Richard Lobb, Farnborough, England
[73] Assignee: Redifon Limited, London, England
[22] Filed: Dec. 26, 1974
[21] Appl. No.: 536,471

Related U.S. Application Data
[62] Division of Ser. No. 310,532, Nov. 29, 1972, abandoned.

[30] Foreign Application Priority Data
Jan. 25, 1972 United Kingdom............... 3429/72

[52] U.S. Cl....................................... 350/7; 178/7.6
[51] Int. Cl.².................... G02B 27/17; H04N 3/00
[58] Field of Search.................. 350/7, 6, 285, 289, 350/199, 286, 287; 178/7.6; 250/236; 356/167

[56] References Cited
UNITED STATES PATENTS
2,070,460  2/1937  Traub ................... 178/7.6
2,139,869  12/1938  Traub ................... 178/7.6
FOREIGN PATENTS OR APPLICATIONS
487,318  6/1938  United Kingdom.................. 178/7.6

Primary Examiner—John K. Corbin
Assistant Examiner—Jon W. Henry
Attorney, Agent, or Firm—Larson, Taylor and Hinds

[57] ABSTRACT

A mirror drum type of light beam, or other radiation beam, scanning device comprising a rotating mirror drum and an arcuate set of optical, or like, elements arranged coaxially with the mirror drum. An incident beam, directed upon the mirror drum strikes each mirror face in turn as the drum rotates. Each mirror face sweeps the reflected beam across each optical element in turn of the arcuate set. Each optical element is adapted to return the beam to the same mirror face whence it came. The same beam is thereby deflected a second time by the same mirror face to produce an angular rate of rotation of the final reflected beam of four times the angular rate of rotation of the mirror drum.

In a modification, a second mirror drum, with convex mirror faces, sweeps the beam over a concave mirror as a pre-scanner, so that the beam follows the reflecting mirror face of the main mirror drum, in rotation. In this modification, the main and second mirror drums may be coaxial and the arcuate set of discrete optical elements replaced by a single element extending over the beam-acceptance arc.

4 Claims, 3 Drawing Figures

SCANNING DEVICES

This is a division of application Ser. No. 310,532, filed Nov. 29, 1972, now abandoned.

This invention relates to scanning devices for producing rapid movement of light paths. The invention can be used in optical scanning systems, particularly in flying spot scanning systems such as are employed, for example, in surface inspection apparatus, in visual display apparatus, in video signal generating apparatus, and in apparatus for data recording and retrieval.

An important criterion in flying spot scanning systems generally, is the speed at which the scan is produced in terms of the rate at which optically resolved elements (spots) are scanned. In a surface inspection system, the "resolved spots per second" (r s p s), decides the time taken to scan a given surface area for defects of a certain minimum size. In a flying spot display system, with a given frame rate and picture area, the r s p s decides the optical resolution of the picture. In a system for generating video signals, the r s p s determines the video signal bandwidth. In flying spot systems for data recording and retrieval, the r s p s gives the rate at which data can be handled.

The optical resolution of flying spot scanning systems is frequently diffraction limited, particularly when laser sources are used. In a flying spot scanner, a fast beam-deflecting device may be used in conjunction with an optical system interposed between the device and the surfaces scanned in order to modify the form of scan produced. The fast deflecting device may also be used in conjunction with a slower beam-deflecting device, so that the two devices together provide a rectangular raster scan. In this case, the fast deflector generally provides a fast, line scan, while the slow beam deflecting device provides a slow frame scan. When the optical resolution of a flying spot scanning system is diffraction limited, the r s p s at which the system is capable of operating depends only on the speed of operation and the construction of the fast beam-deflecting device. This resolution is not affected by any subsidiary optical system or slow beam deflecting device with which the fast beam deflecting device may be used. The present invention is concerned principally with the design and construction of optomechanical fast beam-deflecting devices which limit the scan speed, in r s p s, of the flying spot scanners in which they are incorporated.

In existing fast scanning systems, in which continuous scans, as opposed to random-access, are required, it is common practice to use beam-deflecting devices with rotatable mirror elements to produce the required rapid deflection of radiation paths. Rotatable mirror elements have been found to give the largest scan speeds, in "resolved spots per second", possible in opto-mechanical systems. Typically, the rotatable mirror element of such a beam-deflecting device is in the form of a polygonal prism. Flat rectangular faces of the prism carry mirror facets, and the prism is rotated on its geometrical axis. Light or other radiation is directed at the moving facets, the beam width being limited so that it is incident on one or, at most, two facets at any instant. As the prism rotates, each facet in turn deflects the radiation, giving the required fast scan. Alternatively, the rotatable mirror element may be in the form of a truncated pyramid, rotated on its axis, with flat mirror facets on the trapezoidal faces. In this case, light is usually incident on the mirror facets in a direction parallel with the axis of rotation. The rotatable mirror element may, however, carry only a single reflecting surface.

A general object of the invention is to provide improved scanning devices.

A further object of the present invention is to provide optical scanning devices, using rotatable mirrors as basic beam deflecting elements, which will permit the achievement of increased scanning speeds in terms of the rate at which optically resolved elements are scanned.

In a rotatable mirror device of the known type, the diffraction limited r s p s is proportional to the product of (a) the rotational speed of the rotating mirror element and (b) the width of the scanned radiation beam at the point where it is incident on the rotating mirror element. Clearly, given a certain form of scanning device, the beam width at the rotatable mirror element must determine a minimum size for the rotating component. However, there are practical limits to the speed at which a component of a certain size may be rotated. To achieve a relatively high rotational speed, in association with a relatively large beam width at the rotating mirror element, it is desirable to use forms of beam deflecting devices in which the beam width at the rotating mirror element is a large proportion of the dimensions of the rotating mirror element. The invention can provide such forms of beam-deflecting devices.

Given a certain beam width incident on the rotating mirror element, there are two factors which chiefly determine the physical size of the rotating mirror element, and hence the speed at which the element may be rotated. These factors are, firstly, the number of mirror facets on the rotating mirror element, and secondly, the size of each facet relative to the beam width. To reduce the size of the rotating mirror element, and hence increase the speed at which it may be rotated, it is clearly desirable to minimise the number of mirror facets, and to make each facet as small as possible compared with the beam width. In general, however, there are difficulties both in reducing the number of mirror facets and in reducing the facet size relative to the beam width.

The difficulty in reducing the number of mirror facets is that, as the number of facets is reduced, the scan angle directly produced by each facet is increased. The total scan angle produced by all facets in a single revolution of the mirror element is usually between $4\pi$, (for a prismatic element), and $2\pi$, (for a pyramidal element). This total angle is usually divided equally among the scan angles by each facet. Relatively small scan angles are often required from a fast scanner system, smetimes because large scan angles cannot easily be handled by subsidiary optical systems, so that there is a practical minimum to the number of facets which may be used.

Difficulties in reducing facet size with respect to beam diameter relate to radiation loss and "dead time". Generally, the beam incident on the facets is stationary, and the facets move across the beam. Thus, for at least a part of each facet scan, the incident beam is divided between two facets, and the reflected radiation is split into two beams. One of these beams may be used for part of the time during which the radiation is divided, in which case the other beam is lost. If 50% radiation loss is not acceptable, neither beam may be used for part of the time during which the radiation is divided so that the scan cycle includes some "dead time". In general, neither radiation loss nor "dead time" is desirable. Hitherto, however, it has been necessary to accept some radiation loss, or some dead time or both. These factors are increased by reducing the facet width with respect to the beam width, since this modification increases the proportion of time during which the incident beam is split between two facets.

Accordingly, the invention provides a device for scanning, or deflecting, a beam of radiation, comprising a rotatable body having at least one reflective surface on which the beam is initially incident and by which the beam of radiation is initially reflected, and a static optical system or systems disposed to receive the beam of radiation initially reflected from the rotatable body and to re-direct the beam of radiation back to the rotatable body, so that the beam of radiation is again incident on, and again reflected by the rotatable body.

In one aspect, the invention provides a device for scanning or deflecting a beam of radiation, comprising a rotatable body having at least one reflective surface on which the beam is initially incident and from which the radiation is initially reflected, and a plurality of static optical systems disposed in an arc and adapted to receive each said optical system in sequence, the beam of radiation initially reflected from the rotatable body and to redirect the beam of radiation back to the rotatable body, so that the radiation is again incident on and again reflected by the said reflective surface of the rotatable body.

The rotatable body is rotated so that the radiation beam receives variable deflections at its first and second reflections from the reflective surface of the rotatable body. These variable deflections combine to give the required scanning motion to the path of the radiation beam after the second reflection from the reflective surface of the rotatable body.

The rotatable body conveniently comprises a rotating mirror element, as described previously herein and preferably has a plurality of reflective surfaces or facets.

The static optical systems may be used to sub-divide the scan angles produced by each mirror facet, so that relatively small output scan angles may be produced by a device with a rotatable body having only a few facets.

The static optical systems may be used to eliminate radiation loss. The static optical systems permit beams reflected from more than one mirror facet to be recombined, after a second reflection from the facets, to form a single output beam. Since splitting of the incident radiation at the facets no longer causes radiation loss, such splitting may be permitted for all, or a large part, of each scan cycle. The beam width may therefore be large compared with the mirror facet size, but no dead time need be tolerated. Each static optical system is prferably designed to form a reflected image of one of the reflective facets of the rotatable body back onto the facet; the image being formed at unit magnification and without inversion in a direction orthogonal to the axis of rotation of the rotatable body: Thus, in site of facet movement, each facet is always imaged onto itself, so that radiation leaving a facet after a first reflection, and passing into the static optical system, is returned by the static optical system to the same facet for a second reflection. To achieve this imaging function, each static optical system preferably includes a roof prism with the roof edge parallel to the axis of rotation of the rotatable body and a converging lens set at its focal distance from the rotatable body. The converging lens receives radiation reflected for the first time from the rotatable body, and collimates the radiation with respect to the rotatable body. The roof prism then receives the radiation and reflects it back to the converging lens. The converging lens forms an image of the rotatable body onto itself, in the reflected radiation, at unit magnification. The image is inverted in a direction parallel with the axis of rotation of the rotatable body, but the image is not inverted in a direction orthogonal to that axis. Thus the two areas of the rotatable body irradiated by the beam are of the same size and shape though inverted in a direction parallel with the axis of rotation. The two areas are not separated in a direction orthogonal to the axis of rotation, so that, where the rotatable body is prismatic or pyramidal the two irradiated areas fall on the same facet. There may conveniently be a separation of the two irradiated areas in a direction parallel to the axis of rotation.

Several static optical systems are preferably disposed in an arc about the rotatable body, so that radiation initially reflected from each facet of the body scans across each static optical system in turn. Each static optical system then reflects the radiation back to the originating facet, from which it is again reflected to form the final scanned output beam.

The static optical systems provide a means of obtaining a double reflection from the rotatable body. This double reflection permits the angular scan speed of the final output beam to be double the speed which would be obtained by a single reflection.

The angular amplitude of the scanning movement of the final output beam is equal to double the angular subtense of each static optical system at the rotatable body. Clearly, a number of relatively small-subtense static optical systems may be employed, to reflect the large arc scan produced after a first reflection by each facet of the rotatable body. Thus the total scan angle produced by each facet of the body is effectively subdivided by the static optical systems. Relatively small amplitude final output scans may therefore be produced using a rotatable body having few facets, i.e. easily managed output scan angles may be generated by a body of relatively small diameter.

When the radiation beam is initially incident on more than one facet, the reflected radiation is divided into two or more beams. Using an arrangement of static optical systems as indicated above, each of these separate beams is returned to the facet from which it originates. The beams are then each reflected for a second time at their respective facets. Provided that the static optical systems form a regular and well-adjusted array, it can be arranged that the separated beams re-combine after this second reflection, to form a single scanned output beam. Thus, radiation loss may be avoided, even though the mirror facets of the rotatable body may be small compared with the beam width.

In a second aspect, the invention also provides a device for scanning, or deflecting, a beam of radiation; the device comprising first and second rotatable bodies disposed in the path of the beam of radiation, and a static optical system for relaying the beam from the first rotatable body to the second rotatable body. The second rotatable body preferably has a plurality of reflecting surfaces and as the second rotatable body rotates, each reflecting surface in turn, for a scan period, receives and reflects the incident beam, producing the required scanning motion in the path of the finally reflected beam. The first rotatable body preferably has a plurality of reflecting faces or refracting faces. As the first rotatable body rotates, each reflecting or refracting face in turn receives the incident beam, and the rotations of the two rotatable bodies are synchronised so that the period during which each reflecting or refracting face of the first rotatable body receives the radiation beam is the scan period of a reflecting surface of the second rotatable body. As the first rotatable body rotates, it produces a variable deflection of the radiation beam such that, at the point where the beam is incident on a reflecting face of the second rotatable body, during a scan period, the beam moves substantially at the speed of that reflecting face and in the same direction.

The second rotatable body conveniently comprises a rotating mirror element, as described previously herein.

This second aspect of the invention effectively provides a subsidiary scanning arrangement for use with a rotatable body having a plurality of reflecting facets. The subsidiary scanning arrangement or "pre-scanner" precedes the rotatable body in the radiation path, and provides a small amplitude shift of the beam. The beam is incident on the centre of a mirror facet at the beginning of the scan provided by that facet, and the beam is shifted by the pre-scanner to follow the facet during the facet scan. At the end of the facet scan, the beam is made by the pre-scanner to fly-back onto the next facet.

By using a pre-scanner, the beam width at the rotatable body may be no smaller than the facet width. There is no radiation loss and the dead time, which in this case is the fly-back time of the pre-scanner, may be small. A pre-scanner may conveniently be designed so that it is mounted co-axially with the rotatable body and rotated at the same speed.

The first rotatable body, or pre-scanner, produces a small variable deflection of the beam, enabling the beam to be continuously centred on that reflecting facet of the second rotatable body which is instantaneously providing the major part of the required beam scan. Since the beam is centred on the relevant facet of the second body, the facet need by made no wider than the beam width in order to eliminate radiation loss.

At the end of each scan period, the beam incident on the pre-scanner moves from one reflecting or refracting face of the pre-scanner to the next. This produces a discontinuity in the beam movement provided by the pre-scanner, causing the beam at the second body to jump or fly-back from one facet to the next. The beam width at the pre-scanner may be relatively small, since the prescanner is not required to contribute significantly to the output scan speed in terms of resolved spots per second. If a laser beam is to be scanned, the beam may in fact be focused at the pre-scanner, though it may not be focused at the rotating mirror element. The dead-time of the device is the fly-back period of the pre-scanner, that is the time taken for the gap between pre-scanner faces to move across the beam width. Since the beam width at the pre-scanner, and gaps between pre-scanner faces, may both be small compared with the width of pre-scanner faces, dead time may be a small proportion of useful scan periods.

The radiation beam, after being relayed from the pre-scanner to the second body, may then be reflected more than once from the relevant mirror facet. This may be accomplished by returning the beam to the second body by means of a static optical system or systems. By producing double or multiple reflections at each facet of the second rotatable body the r s p s produced by a given rotational speed of the second body with a given facet width can be multiplied.

Since the rotation of the pre-scanner must be synchronised with that of the second body, the pre-scanner may conveniently be given the same number of faces as the second body, so that the two rotational speeds are required to be equal. Then, the pre-scanner and the second body may be rotated on the same axis by the same drive motor, and the two rotatable bodies may in fact be rigidly connected.

In order that the invention may be readily carried into practice, two embodiments of the invention will now be described in detail, by way of example only, with reference to the accompanying drawings, wherein.

Figure 1:
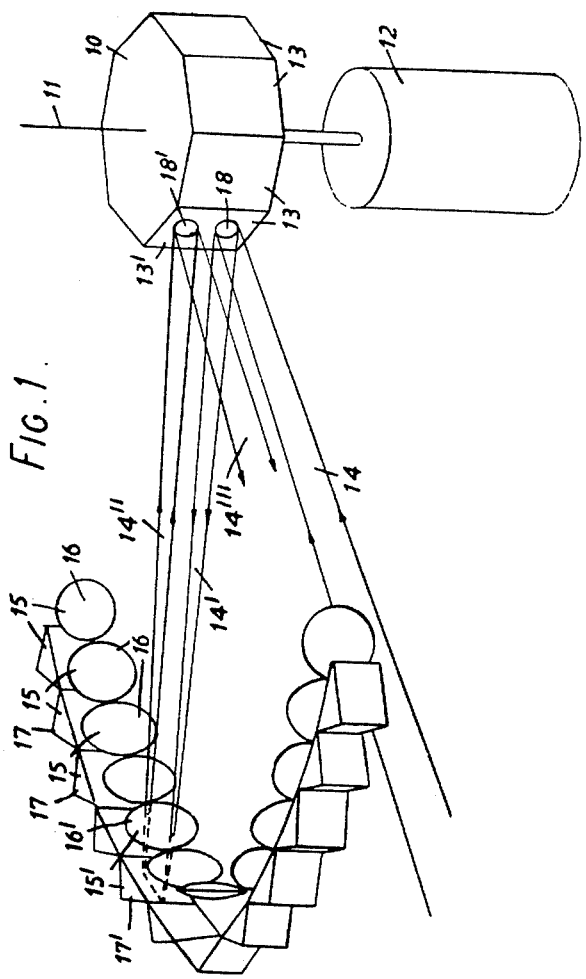
FIG. 1 is a perspective view of a scanning device made in accordance with the invention.

The scanning device shown in FIG. 1 has a rotatable body 10, in the form of a regular polygonal prism which is rotated about its vertical geometrical axis, 11 by a motor 12. The vertical rectangular side facets 13, of the body 10, are flat and polished to reflect radiation as mirrors. A converging laser beam 14, is directed at the body 10, along a path which is constant with time, and is instantaneously incident on one facet 13' of the facets 13. A set of identical static optical systems 15 are set in an arc centred close to the axis 11. The arc lies in the horizontal plane including the contres of the vertical side facets 13. The beam 14 is directed towards the axis 11 in a direction slightly upward of horizontal, to strike the mirror facet 13' at an area 18 below the centre of the facet. Thus the beam passes below the arc of static optical systems, 15. The beam 14, is reflected by the facet, 13' to form a beam 14'. The beam 14' is deflected in an arc as the facet 13' rotates, so that the beam is incident on, and moves across, each of the static optical systems 15, in turn. Instantaneously, the beam is incident on one, 15' of the static optical systems 15 as shown.

Each of the static optical systems 15, comprises a field lens 16, and a roof prism 17. The focal point of each field lens, 16 is set immediately above the illuminated facet area, on a level with the facet centres. A roof prism 17, is set behind each field lens 16. The beam 14' is transmitted through one 16' of the lenses 16 to one 17' of the prisms 17. The roof edge of each prism 17, is set vertical. The roof prism 17' reflects the incident beam 14' to form beam 14''. The beam 14'' is transmitted through the field lens 16' and returns to the facet 13' from which the beam 14' originated. The convergence of the beam 14, 14' is adjusted so that the beam 14' reaches a focus at the roof prisms 17. The beam 14'' is therefore diverging as shown in the diagram.

Each static optical system 15 forms an image of the body 10, in any radiation received from the mirror element, back onto the body 10. This image is formed at unit magnification, and is inverted but not laterally reversed. Thus, an inverted image of each rectangular mirror facet 13 is formed on the same mirror facet 13.

The area 18, in the lower part of facet 13' which is irradiated by the beam 14, is thus imaged by the static optical system 15' onto a similar area 18', in the upper part of the same facet 13'. The beam 14' therefore irradiates the area 18'. The beam 14'' is reflected from the facet 13' to form the beam 14'''. The directions of beams 14, 14' 14'' and 14''' are all slightly upward of horizontal, since, all optical surfaces being substantially vertical, there is no vertical deflection of the original beam 14 or its subsequent reflections. Thus the beam 14''' passes out of the scanning system above the arc of static optical systems 15.

The beam is brought to a focus at the static optical systems 15 in order to minimise "dead time" between scans associated with neighbouring static optical systems 15. If the beam is narrow at the static optical systems 15, the period during which the beam is split between neighbouring systems may be brief.

As the body 10 rotates through an angle $\theta$, the beam 14' is deflected through a horizontal angle of $2\theta$, (neglecting the small reduction in deflection due to non-horizontal incidence of beam 14). The focused laser spot associated with beam 14' moves a distance of $2\theta f$ across the static optical system 15', where $f$ is the distance from the facets 13 to the static optical systems 15. The focused laser spot is reflected in the roof prism 17' and the direction of motion of the reflected image is reversed by the double reflection at the roof prism 17', so that the focused spot associated with beam 14'' moves through a distance $-2\theta f$. Thus, as the body 10 rotates through an angle $\theta$, the returning beam 14'' is deflected through an angle $-2\theta$. The horizontal angle which the returning beam makes with the facet 13' is altered by an angle $3\theta$ while the facet itself turns through an angle $\theta$. The horizontal deflection of the final output beam 14''', is therefore $4\theta$. Thus, the angular speed of the final output scan is four times the angular speed of rotation of the body 10. This is double the output scan speed which could be achieved by a single reflection from the body 10, and is made possible by the use of the static optical systems 15.

Suppose that the static optical system subtends an angle $2\phi$, at the rotatable body 10. Then a rotation $\phi$, of the body 10 scans the beam 14' across the width of the static optical system, producing a final output scan amplitude of $4\phi$. Thus the angular amplitude of final output scans is double the angular subtense of each static optical system 15 at the body 10. Therefore, the amplitude of final output scans can be limited to a convenient value by use of sufficiently small subtense static optical systems 15.

As the beam 14' is incident on the roof edge of each optical system 15 there is no horizontal displacement of the reflected beam 14'' from the beam 14'. In the plan view of FIG. 1, the path 14'' is superimposed on the path 14'. The deflection of the beam 14'' at the body 10 is on these occasions equal and opposite to the deflection of beam 14. Thus the beam 14''' is, in this plan view of FIG. 1, superimposed on beam 14. Individual final output scans are associated with single traverses of the radiation across individual static optical systems 15, the mid-point of each scan occurring as the radiaton meets the edge of the roof prism 17 at the centre of each static optical system 15. The beam 14''' lies in the same direction when the radiation passes any roof edge and thus the final scanning movement of beam 14''' is substantially duplicated in scans associated with each static optical system 15.

Suppose that the incident beam 14 is in each revolution of the body 10 incident on part of a mirror facet 13, during a rotation angle $\psi$. Given a certain ratio of beam width to facet width, the value $\psi$ must be approximately in inverse proportion to the number N of mirror facets 13.

Mathematically:

$$\psi = k/N \quad (1)$$

where $k$ is a constant depending on the ratio of beam width to facet width. Given a requirement for output scan angles no larger than $4\phi$, we must have static optical systems with a subtense no greater than $2\phi$. The beam, 14' is scanned in an arc $2\psi$ wide, so that the minimum number $n$, of static optical systems required to prevent loss of radiation is:

$$n = 2\psi/2\phi \quad (2)$$

Substituting for in equation (1) gives:

$$N = k/n\phi \quad (3)$$

Thus, a requirement for small and easily managed scan angles $4\phi$, tends to increase the number $N$ of facets required on the body 10. This in turn increases the necessary diameter of the body 10 reducing the speed at which it may in practice be rotated. However, the larger the number $n$ of static optical systems, the smaller the number $N$ of facets which are required. Thus, the use of static optical systems permits a smaller body 10 to be used and faster running speeds can be achieved.

Figure 2:
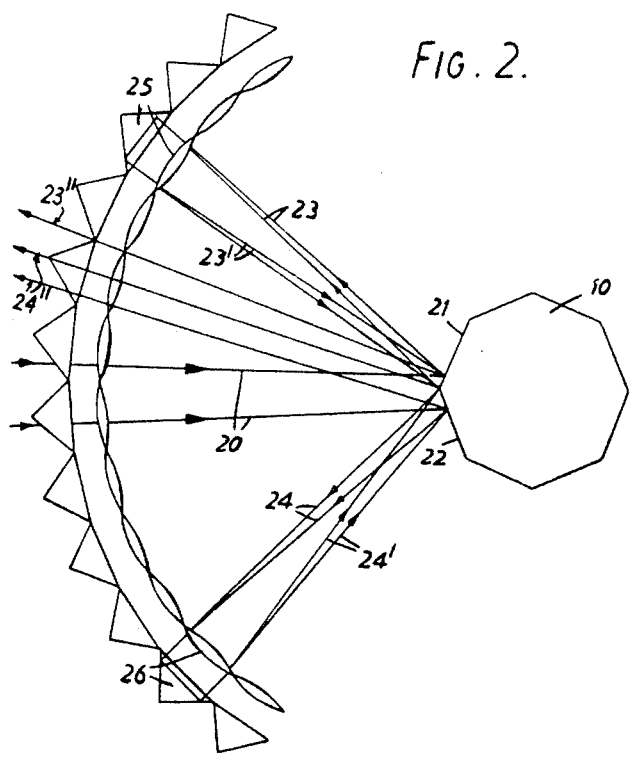
FIG. 2 is a plan view of the device shown in FIG. 1.

FIG. 2 depicts how radiation loss is eliminated in the device.

In FIG. 2, the incident converging laser beam 20 illuminates two neighbouring facets 21 and 22, or the body 10. The reflected radiation is therefore divided into two beams, that is a beam 23 reflected from the facet 21, and a beam 24 reflected from the facet 22. The two reflected beams 23, 24 are incident on different static optical systems; the beam 23 passing into a system 25 and beam 24 passing into a system 26.

The beam 23 is reflected by the system 25 to form a beam 23' and the beam 24 is reflected by the system 26 to form a beam 24'. The beam 23' returns to an area of the facet 21 which is above the area of that facet 21 illuminated by the initially incident beam 20. Likewise, the beam 24' returns to an area of the neighbouring facet 22, above the area of that facet 22 illuminated by the beam 20. Thus, the two facet areas illuminated by the returning beams 23' and 24' are neighbouring areas.

The beam 23' is reflected from the facet 21 to form a beam 23'', while the beam 24' is reflected from the facet 22 to form a beam 24''.

It is arranged that the angle subtended, at the body 10, between the static optical systems 25 and 26, and between similar pairs of static optical systems, is equal to the angular separation of divided beams 23 and 24. This separation is always double the angle between neighbouring facets of the body 10.

It follows that the scans produced in the final output beams 23'' and 24'' are in phase, i.e. the beams 23'' and 24'' are always deflected through the same horizontal angle with respect to the incident beam 20. Since the beams 23'' and 24'' originate from neighbouring areas, and scan in phase, they effectively form a single final output beam. Thus, by using static optical systems as described, splitting of the incident beam between two facets of the rotating mirror element does not produce radiation loss or necessitate introduction of dead time.

The beam width at the body 10 may actually be larger than the facet width, so that more than two facets may be simultaneously in use. The three or more beams into which the primary beam is then divided, may be recombined into a single output beam, using the static optical systems, essentially as described above.

Figure 3:
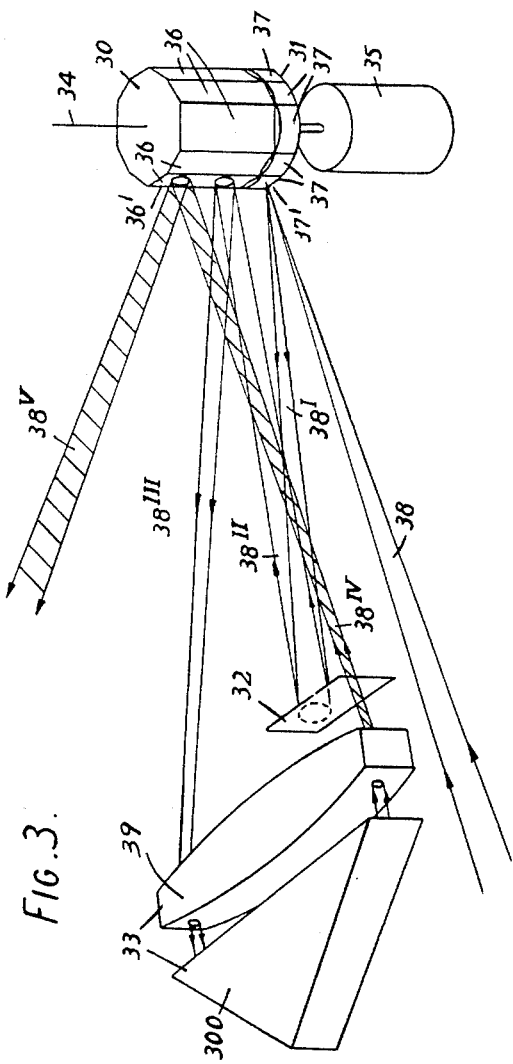
FIG. 3 is a perspective view of a further scanning device made to accordance with the invention.

FIG. 3 shows a further embodiment of the invention. As shown, the device has a rotatable body 31 acting as a pre-scanner, a second rotatable body 30, a concave mirror 32, and a single static optical system 33. The system 33 consists of a field lens 39 and a roof prism 300. The body 30 is in the form of a regular polygonal prism, rotated about its vertical geometrical axis, 34, by a motor 35. The vertical rectangular facets, 36 of the prism are flat and polished to form mirrors.

The first body or pre-scanner 31 is rigidly attached to the body 30 and is rotatable therewith. The pre-scanner 31 has a regular array of mirror facets 37, but the facets 37 are not flat but instead have a convex curvature. The number of facets 37 is the same as the number of facets 36 and the centres of the curved facets 37 are substantially parallel with corresponding flat facets 36. Each pre-scanner facet 37 is spherically curved, with its centre of curvature close to, but not at, the axis of rotation 34.

A laser beam 38 following a stationary path is directed at the axis of rotation 34 and is focused in the rgion of the pre-scanner facets so as to be inastantaneously incident on one 37' of the prescanner facet 37. The laser beam 38 is reflected from the pre-scanner 31 to form a diverging beam 38'. Rotation of the pre-scanner 31 produces a relatively small change in the angle of incidence of the beam 38 on the pre-scanner facet 37'. It is arranged that, as each facet 37 passes across the beam 38, the reflected beam 38' is deflected through an angle equal to its divergence angle so that, at all stations in its path, the beam 38' is deflected by its own width. The scanning motion produced in the beam 38' may be described as "sawtooth". The beam 38' is deflected linearly as each prescanner facet 37 passes through the illuminated area, but, as each discontinuity between neighbouring facets 37 passes through the illuminated area, the beam 38' flies-back by its own width.

The beam 38' is incident on the concave mirror 32 which reflects the radiation back to form a beam 38''. The concave mirror 32 directs the beam 38'' towards the body 30 where, instantaneously, the beam is incident on a lower part of one, 36¹ of the facets 36. The concave mirror 32 causes the beam 38'' to converge, but not to reach a focus. The facet 36¹ reflects the beam 38'' to form a beam 38'''. The beam 38''' is incident on the static optical system 33 and the beam 38''' reaches a focus at the roof prism 300. The static optical system 33 returns the radiation to an upper part of facet 36', as beam 38^IV which, for convenience, is shown shaded in FIG. 3. The static optical system 33 has the property of forming an inverted, but not reversed, image of the rotating body 30 onto itself, so that radiation leaving a facet is always returned to the same facet 36. The beam 38^IV is reflected by the facet 36' to form the final scanned output beam 38^V, which is also shown shaded in FIG. 3.

It is arranged that the beam width at the body 30 is equal to the width of each facet 36 of the body 30. The beam 38'' as a continuation of beam 38', is scanned through its own width as each facet, of either the pre-scanner 31 or the body 30, moves through its own width. Thus, the beam 38'', where it is incident on the body 30, is moved by the pre-scanner 31 at the speed of the facets 36. The beam 38'' is continuously centred on a facet 36 during the period in which that facet 36 moves by its own width. The beam 38'' then flies-back to be centred on the following facet 36 to repeat the cycle.

The use of the pre-scanner 31 thus provides a means by which the beam width at the body 30 may be no smaller than the facet width of the pre-scanner 31 without introducing radiation loss by division of the incident beam between two facets. Thus, given a certain beam width, the facet width of the body 30, and hence the diameter of the body 30, may be minimised so that the rotational speed of the body 30 can be maximised.

It is not essential that the radiation should be returned to the body 30 for a second reflection, as indicated in FIG. 3. Use of static optical systems to produce double or multiple reflection at the body 30 is however possible with the pre-scanner 31.

In the particular embodiments described above, the scanner devices are used to introduce scanning movement in light beams derived from lasers. It is to be understood, however, that the invention has application to beams of ultra-violet and infra-red radiation, as well as visible light radiation. Also, the beams scanned may be derived not only from laser sources, but from any radiation source, including a radiation reflecting area or areas.

It is also to be understood that the invention has application in scanning of an extended radiant object area across a stationary radiation detector. Such systems are sometimes known as "flying aperture" rather than "flying spot" scanning systems, since in these cases radiation is more readily understood to be received from a moving area rather than being emitted to a moving area. The beam reflecting devices used in "flying aperture" systems may however be similar to those used in flying spot systems.

In a form of "flying aperture" system, the devices may be used to track a moving radiant area.

What we claim is:

1. A device for scanning or deflecting a beam of radiation comprising a first rotatable body having at least one reflective surface on which the beam is initially incident and by which the beam of radiation is initially reflected; a static optical system disposed to receive the beam of radiation initially reflected from said first rotatable body and to reflect said beam therefrom; and a second rotatable body having at least one reflective surface on which said beam reflected from said optical system is incident, and thereby, reflected, in which the second said rotatable body is a mirror drum of regular polygonal cross-section, having a plurality of mirror face facets, and is rotatable about its axis, and in which the first said rotatable body is a mirror drum of regular shape, having a plurality of curved convex mirror facets, and is rotatable about its axis.

2. A device as claimed in claim 1, wherein said beam of radiation is initially convergent to reach a focus substantially at said reflective surface of said first rotatable body.

3. A device as claimed in claim 1, in which the first and second rotatable bodies each have the same number of mirror face facets and are fixed together and rotatable about the same axis.

4. A device as claimed in claim 1, wherein said static optical system for relaying the said beam from the first rotatable body to the second rotatable body is a concave mirror.

* * * * *